(12) United States Patent
Singh et al.

(10) Patent No.: US 10,079,572 B2
(45) Date of Patent: Sep. 18, 2018

(54) METHODS AND SYSTEMS FOR PERFORMANCE RATIO-BASED SCHEDULING OF SOLAR MODULE MAINTENANCE

(71) Applicant: FLEX LTD., Singapore (SG)

(72) Inventors: Amitabh Singh, Belmont, CA (US); Andras Boross, Belmont, CA (US); Cheau-Long Ng, San Bruno, CA (US); Stephen J. Voss, Louisville, CO (US); Anastasios Golnas, Kinsington, MD (US)

(73) Assignee: FLEX LTD., Singapore (SG)

( * ) Notice: Subject to any disclaimer, the term of this patent is extended or adjusted under 35 U.S.C. 154(b) by 600 days.

(21) Appl. No.: 14/463,316

(22) Filed: Aug. 19, 2014

(65) Prior Publication Data

US 2016/0056760 A1 Feb. 25, 2016

(51) Int. Cl.
*H02S 50/00* (2014.01)

(52) U.S. Cl.
CPC ..................... *H02S 50/00* (2013.01)

(58) Field of Classification Search
None
See application file for complete search history.

(56) References Cited

U.S. PATENT DOCUMENTS

| | | | | |
|---|---|---|---|---|
| 7,752,013 B1* | 7/2010 | Broyles | ............... | G06F 11/3447 |
| | | | | 702/182 |
| 8,289,183 B1* | 10/2012 | Foss | ......................... | H04Q 9/00 |
| | | | | 340/870.02 |
| 2011/0100420 A1* | 5/2011 | Clevenger | ............ | G02B 26/007 |
| | | | | 136/246 |
| 2012/0310427 A1* | 12/2012 | Williams | .................. | G05F 1/67 |
| | | | | 700/287 |
| 2013/0338947 A1* | 12/2013 | John | ......................... | H02J 7/35 |
| | | | | 702/60 |
| 2015/0012258 A1* | 1/2015 | Caine | .................. | G06F 17/5009 |
| | | | | 703/18 |

OTHER PUBLICATIONS

Tetra Tech Inc., "Solar PV System Maintenance Guide" United States Agency for International Development, Apr. 2013.*

\* cited by examiner

*Primary Examiner* — John Kuan
(74) *Attorney, Agent, or Firm* — Carter, DeLuca, Farrell & Schmidt, LLP

(57) ABSTRACT

A method for performance ratio-based scheduling of solar system maintenance is implemented by a monitoring computing device. The monitoring computer device includes a processor in communication with a memory. The method includes receiving a plurality of production data associated with a solar system, determining at least one performance ratio based upon at least a portion of the plurality of production data wherein each performance ratio is associated with a range of expected performance values, validating the at least one performance ratio, determining that the at least one performance ratio is outside the range of expected performance values, and adjusting a maintenance schedule associated with the solar system based upon the at least one performance ratio.

5 Claims, 7 Drawing Sheets

METHODS AND SYSTEMS FOR PERFORMANCE RATIO-BASED SCHEDULING OF SOLAR MODULE MAINTENANCE

FIELD

The field of the disclosure relates generally to the maintenance of photovoltaic (PV) modules or systems. More particularly, this disclosure relates to methods and systems for using performance ratios to schedule the maintenance and repair of PV modules.

BACKGROUND

PV or solar modules are used for significant periods of time, e.g., twenty years or longer. Solar modules may be used in differing environments and accordingly may be exposed to a variety of different conditions including, for example, varying temperatures, precipitation, wind, light levels, and other conditions associated with a physical location. Further, solar modules vary in condition in terms of ages, designs, and operational conditions.

In order to maximize efficiency and life span, solar modules require maintenance. Solar modules typically undergo scheduled maintenance at a pre-determined interval such as a quarterly, monthly, or yearly interval. Because of the varying environments and conditions of solar modules, scheduling maintenance in a fixed manner may be undesirable. In some cases, the conditions and environment of a solar module may make it appropriate for a more or less frequent maintenance interval. Accordingly, adjusting the maintenance scheduling based upon the conditions and environment of the solar array may allow for the solar array, modules and other system components to perform at greater efficiency and for a longer life span.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF SUMMARY

In one aspect, a method for performance ratio-based scheduling of solar system maintenance implemented by a monitoring computing device is provided. The monitoring computer device includes a processor in communication with a memory. The method includes receiving a plurality of production data associated with a solar system, determining at least one performance ratio based upon at least a portion of the plurality of production data wherein each performance ratio is associated with a range of expected performance values, validating the at least one performance ratio, determining that the at least one performance ratio is outside the range of expected performance values, and adjusting a maintenance schedule associated with the solar system based upon the at least one performance ratio.

In another aspect, a monitoring computing device used to perform performance ratio-based scheduling of solar system maintenance is provided. The monitoring computing device includes a processor and a memory in communication with the processor. The processor is configured to receive a plurality of production data associated with a solar system, determine at least one performance ratio based upon at least a portion of the plurality of production data, wherein each performance ratio is associated with a range of expected performance values, validate the at least one performance ratio, determine that the at least one performance ratio is outside the range of expected performance values, and adjust a maintenance schedule associated with the solar system based upon the at least one performance ratio.

Another aspect of the present disclosure is a computer-readable storage media for performance ratio-based scheduling of solar system maintenance. The computer-readable storage media has computer-executable instructions embodied thereon, wherein, when executed by at least one processor, the computer-executable instructions cause the processor to receive a plurality of production data associated with a solar system, determine at least one performance ratio based upon at least a portion of the plurality of production data, wherein each performance ratio is associated with a range of expected performance values, validate the at least one performance ratio, determine that the at least one performance ratio is outside the range of expected performance values, and adjust a maintenance schedule associated with the solar system based upon the at least one performance ratio.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION

Figure 1:
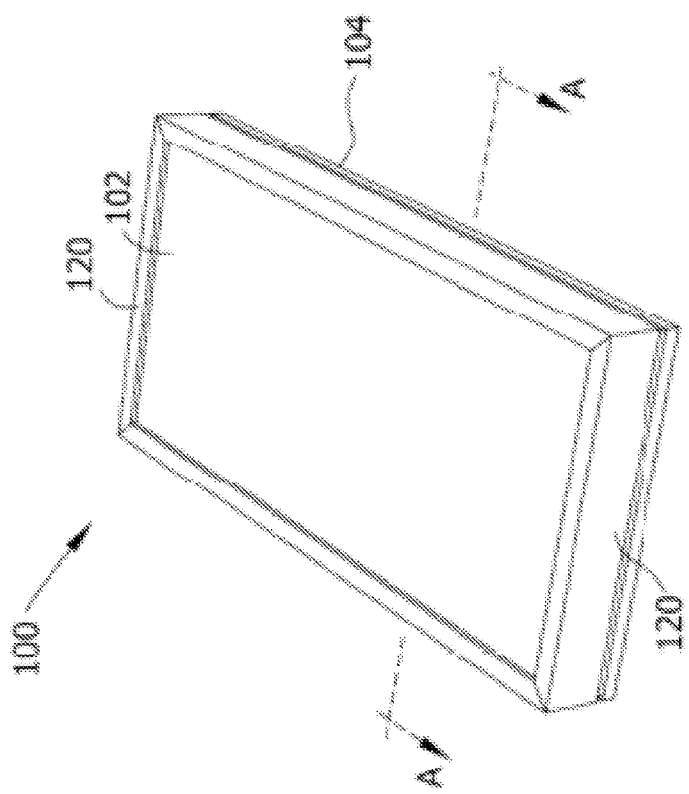
FIG. 1 is a perspective view of an example photovoltaic (PV) module.

The embodiments described herein generally relate to maintenance of photovoltaic (PV) systems or solar modules. More particularly, the embodiments described herein relate to methods and systems for performance ratio-based scheduling of solar module maintenance.

Computer systems, such as monitoring computing devices are described, and such computer systems include a processor and a memory. However, any processor in a computer device referred to herein may also refer to one or more processors wherein the processor may be in one computing device or a plurality of computing devices acting in parallel.

Additionally, any memory in a computer device referred to may also refer to one or more memories, wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor." The term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above are only examples, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a server computer. In a further embodiment, the system is run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The system and method described herein facilitates improved scheduling which factors in the varying conditions and makeups of solar modules, arrays and power plants. More specifically, the system is configured to (a) receive a plurality of production data associated with a solar power plant, (b) determine at least one performance ratio based upon at least a portion of the plurality of production data, wherein each performance ratio is associated with a range of expected performance values, (c) validate the at least one performance ratio, (d) determine that the at least one performance ratio is outside of the range of expected performance values, and (e) adjust a maintenance schedule associated with the solar power plant based upon the at least one performance ratio.

Solar power plants are deployed for significant periods of time and may be exposed to a variety of different conditions including, for example, varying temperatures, precipitation, wind, light levels, and other conditions associated with a physical location. Further, solar modules, arrays and power plants vary in condition in terms of ages, designs, and operational conditions. In order to maximize efficiency and life span, solar power plants require maintenance. Solar modules, arrays and power plants typically undergo scheduled maintenance at a pre-determined interval such as a quarterly, monthly, or yearly interval. Because of the varying environments and conditions of solar power plants, scheduling maintenance in a fixed manner may be undesirable. In some cases, the conditions and environment of a solar power plant may make it appropriate for a more or less frequent maintenance interval. Accordingly, adjusting the maintenance scheduling based upon the conditions and environment of the solar power plant may allow for the solar power plant to perform at greater efficiency and for a longer life span.

The systems and methods described facilitate improved scheduling of the maintenance of solar power plants by determining performance ratios (or production ratios) and using such ratios to schedule maintenance of solar power plants. The systems and methods are implemented using a monitoring computing device that calculates performance ratios. The performance ratios described herein substantially compare the measured performance of PV systems to projected performances. Such performance ratios may accordingly be used to schedule maintenance or servicing of PV systems when the performance ratios indicate a significant variance between the measured performance and the projected performance. Alternately, the performance ratios may be used to recalibrate the projected performance. The monitoring computing device accordingly improves the timely servicing of PV systems and improves the quality of projected performance of PV systems.

A plurality of production data is received at the monitoring computing device from a solar power plant. Production data includes information related to the performance and output of the solar power plant as well as data related to the condition and environment of the solar power plant. As noted below in the discussion of the calculated performance ratios, the production data may include a variety of data associated with PV systems including power outputs, irradiance measurements, energy outputs, temperature measurements, insolation measurements. Further, a plurality of additional data may be received to facilitate the calculation of performance ratios. For example, reference values may be received indicating power output or irradiance under standard test conditions. Alternately, a reference value for energy or insolation may be used. Reference values may indicate the expected value associated with the PV system during the time period where a measured value is also received. The production data is also stored as historical production data.

The monitoring computing device determines at least one performance ratio based upon the production data. The performance ratio may include a standard performance ratio ("PR"), a temperature adjusted performance ratio ("PRt"), an investor performance ratio ("IPR"), a monitoring performance index ratio ("MPIR"), and an operating performance ratio ("OPR"), as described above. Alternately, the performance ratio may be any other suitable ratio used for the scheduling of the maintenance of solar power plants.

PR is calculated by comparing the performance of solar modules, arrays or power plants to a reference value. More specifically, PR is calculated by comparing a ratio of the power output performance of the PV system to an irradiance of the PV system. Accordingly, PR may be described in Equation 1 below:

$$PR = \left(\frac{P}{P_{STC}}\right) / \left(\frac{I}{I_{STC}}\right) \quad \text{Equation 1}$$

In Equation 1, P indicates a measured power output of the PV system, $P_{STC}$ indicates a power output capacity of the PV system under standard test conditions (STC), I indicates a measured irradiance of the PV system, and $I_{STC}$ indicates irradiance of the PV system under standard test conditions (STC). PR may be utilized in a variety of examples. PR requires little additional information provided that power output and irradiance may be measured and $P_{STC}$ and $I_{STC}$ are known. PR is a relatively simple metric that provides significant insight into the performance of solar modules, arrays, and power plants.

Performance ratios can be further refined by normalizing the operating temperature of the solar modules to standard test conditions (25° C.). In the example embodiment, $PR_t$ is calculated by comparing the performance of solar modules to a reference solar module, and further normalizing performance of the solar module and the reference solar module to adjust for temperature variation by normalizing such performance data by 25° C. Module temperature data is measured at the PV system as $T_{module}$. Accordingly, $PR_t$ is partially a function of PR as described in Equation 1, above. In other examples, performance data may be normalized by using a scaled temperature value, as described below. In one example, $PR_t$ is described by Equation 2 below:

$$PR_t = \frac{PR}{1 + k*(T_{module} - 25)} \quad \text{Equation 2}$$

$T_{module}$ is the measured temperature of the PV system at the time of the measured power and irradiance. Variable k is a constant scaling factor that may be adjusted. More specifically, k is a temperature coefficient of power used to represent the degradation of a solar panel as temperature increases. k may be measured by the panel manufacturer and depends on the material properties of the particular solar panel. For example, an amorphous silicon solar panel may have a different value of k than a crystalline silicon solar panel. Further, similar types of solar panels may vary in k values depending upon the manufacturer. The temperature of the module is normalized to the STC value of 25 degrees in the example embodiment. In alternative examples, the temperature may be adjusted by alternative values for which reference PV system operational data is available. In the example embodiment, k has a value of −0.0004 or −0.4%. $PR_t$ is a more accurate measurement of the performance of the system than PR. By including temperature information, $PR_t$ normalizes for fluctuations in both solar radiation and temperature to isolate the performance characteristics of the PV system. $PR_t$ is particularly useful in 24-hour performance testing during the commissioning of a PV system.

In the example embodiment, IPR is calculated by comparing the performance of a solar power plant to a reference energy or power output. The reference energy or power output factors in historical weather and climate conditions for the location of the solar power plant. Due to variation in weather and climate, IPR is more suitable for energy output analysis over longer periods as variation in weather and climate occurs more over shorter periods. The calculation for reference energy is typically determined by an engineer during the design of the system. In one example, IPR is described by Equation 3, below:

$$IPR = E/E_{ref} \quad \text{Equation 3:}$$

E is the measured energy output over a particular time period and $E_{ref}$ is the reference energy output over a particular time period. In at least some examples, IPR is utilized by investors and financial backers of PV systems. IPR allows investors or financial backers to determine how well the PV system is performing as a financial asset. IPR is also suitable for performance analysis over longer periods such as months, quarters, or years.

OPR adjusts IPR based upon actual weather and climate conditions. More specifically, OPR adjusts IPR using a ratio of the actual incident solar radiation (insolation) compared to a reference insolation value. Accordingly, in one example, OPR may be described by Equation 4, below.

$$OPR = \frac{IPR}{\frac{Ins}{Ins_{ref}}} = \frac{\frac{E}{E_{ref}}}{\frac{Ins}{Ins_{ref}}} \quad \text{Equation 4}$$

In Equation 4, Ins represents a total insolation value during a time period measured for E and $E_{ref}$. Ins may be measured in watts per square meter, megajoules per square meter (MJ/m2) or joules per square millimeter (J/mm2). OPR is particularly useful in monitoring solar assets in real-time. Further, the ratio of actual insolation over a time period to a reference insolation allows OPR to adjust for variability in meteorological conditions.

In the example embodiment, MPIR is calculated by adjusting production data of a solar module based upon the actual weather and climate conditions. More specifically, in the example embodiment MPIR is calculated by applying a temperature correction factor to the OPR calculation. The temperature correction factor may be substantially similar to the factor used in the calculation of $PR_t$. Accordingly, in one example, MPIR may be indicated by Equation 5, below:

$$MPIR = \frac{OPR}{1 + k*(T_{module} - 25)}$$

As in the calculation of $PR_t$, $T_{module}$ is the measured temperature of the PV system at the time of the measured power and irradiance and variable k is a constant scaling factor that may be adjusted. Like OPR, MPIR is useful in monitoring solar assets in real-time and adjusts for variability in meteorological conditions. In several examples, MPIR is the most accurate ratio for measuring the production of PV systems.

Each performance ratio is associated with a plurality of performance threshold values that identify a range of expected performance values. In at least one example, a lower performance threshold value is the lower boundary of the range of expected performance values and an upper performance threshold value is the upper boundary of the range of expected performance values. The performance thresholds are determined by calculating an acceptable variance of the at least one performance ratio based upon the historical production data. In at least some examples, the historical performance data is used to extrapolate an estimated performance ratio. In one example, a linear regression is performed on the historical performance data to identify a function substantially fitting the historical performance data. The extrapolated values of the performance thresholds may accordingly be determined by applying present actual values or expected values (e.g., time periods or expected irradiance values) to an equation determined by the regression. The estimated performance ratio accordingly represents a predicted performance ratio for the solar module, array or power plant based on historical production data that does not include the current production data. The estimated performance ratio may be compared to the performance ratio to determine variation.

Acceptable variance may be determined by determining the impact of variance to the production of the PV system. Based upon defaults or user inputs, a tolerance for production variance may be determined and a corresponding variance of the production ratio may be identified.

The performance ratio is also validated by the monitoring computing device. The monitoring computing device may validate the performance ratio using multiple techniques. In a first example, performance ratios associated with time periods proximate to the calculated performance ratio may be determined to eliminate performance ratios based on transitory inaccurate measurements. More specifically, if performance ratios from proximate time periods vary substantially from the determined performance ratio, the determined performance ratio may be identified as invalid.

In a second example, performance ratios may be compared to other metrics from the same time period to identify invalid performance ratios based on inaccurate measurements. For example, multiple performance ratios described herein may be calculated and compared to identify invalid performance ratios. More specifically, if a determined performance ratio is inconsistent with a secondary performance ratio calculated over the same time period, the determined performance ratio (and the secondary performance ratio) may be determined to be invalid.

The monitoring computing device also compares the performance ratio to the range of expected performance values determined based on the plurality of performance thresholds. If the performance ratio is outside of the range of expected performance values (i.e., below a lower boundary or above an upper boundary), the solar module, array or power plant may be identified as requiring maintenance. In some examples, the range of expected performance values is a single performance value determined by a single performance threshold. Accordingly, if the performance ratio is less than or greater than the single performance threshold (or the range of expected performance values), the solar module, array or power plant may be identified as requiring maintenance. Exceeding the performance threshold refers alternately to the performance ratio falling below the performance threshold or exceeding the performance threshold.

Upon determining that the performance ratio is outside of a range of expected performance values, the monitoring computing device may adjust a maintenance schedule associated with the solar module, array or power plant based on the determined performance ratio. In many examples, PV systems are associated with maintenance schedules indicating that the PV system should be maintained or serviced using a particular schedule. Depending upon the determined performance ratio, a next maintenance activity may be scheduled immediately or may be advanced slightly. Alternately, the maintenance schedule may be generally adjusted based on the performance ratio. When maintenance is advanced in schedule, all subsequent maintenance activities may similarly be advanced in schedule. Alternately, the interval between maintenance may be adjusted. In at least one example, a maintenance schedule may initially include two cleanings or washings per solar array per year. However, external conditions such as weather conditions may impact performance ratios and thus impact maintenance schedules. In one example, rainy weather may reduce soiling because contaminants wash off of the solar arrays. Accordingly, performance ratios for the solar array may not substantially degrade due to soiling. In this example, such cleanings and washings may be reduced in frequency or skipped due to the performance ratio. In a second example, weather conditions may be sunny and smoggy and lead to a higher rate of soiling. Accordingly, in these conditions, performance ratios may degrade substantially because of the soiling. In this example, the performance ratio may cause an increase in the frequency of scheduled cleanings or washings.

In some examples, a performance ratio may be consistent with the failure of a device associated with the PV system. For example, an inverter may be faulty. In some examples, the monitoring computing device determines that a performance ratio indicates a faulty device may exist within the PV system. In such cases, the monitoring computing device may identify whether a device is in a failure state. In one example, the monitoring computing device checks or queries the device for error codes or messages. In another example, a technician may be alerted to identify whether the device is in an error state. Upon determining that the device is in an error state, the monitoring computing device transmits a signal associated with the failure. For example, the monitoring computing device may request service for the failed device.

In at least some examples, the monitoring computing device may identify a probable cause of a performance ratio falling below or above a range of expected performance values. For example, the monitoring computing device may query a diagnostic table to identify what particular performance ratios may indicate. The monitoring computing device may identify at least one potential cause for the determined value of the performance ratio. The monitoring computing device may alert a user of the potential cause.

Alternately, in some examples, a performance ratio may indicate that an expected or projected value associated with the performance ratio is inaccurate. In such examples, the performance ratio may be used to recalibrate the calculation of expected or projected values. For example, in the case of PR, a particular value of PR may indicate that a PV system should be maintained or serviced. However, upon maintenance, it may be determined that such a PV system is in expected condition. In such cases, the calculated PR may be used to adjust the calculation of $P_{STC}$ and $I_{STC}$.

A technical effect of the systems and methods described herein include at least one of (a) improved production of PV systems through improved timely maintenance processes; (b) increasing the reliability of production data measurements through improved maintenance and calibration; and (c) reduced cost and time in diagnosis of PV system problems by applying performance ratios to maintenance scheduling.

More specifically, such technical effects can be achieved by performing at least one of the following steps: (a) receiving, at the monitoring computing device, a plurality of production data associated with a solar module; (b) determining at least one performance ratio based upon at least a portion of the plurality of production data, wherein each performance ratio is associated with a range of expected performance values, the range of expected performance values determined based on a plurality of performance thresholds; (c) validating the at least one performance ratio; (d) determining that the at least one performance ratio is outside the range of expected performance values; (e) adjusting a maintenance schedule associated with the solar module based upon the at least one performance ratio; (f) storing the plurality of production data as historical production data; (g) retrieving the historical production data; (h) determining at least one estimated performance ratio by extrapolating from the historical production data; (i) comparing the at least one estimated performance ratio to the at least one performance ratio; (j) generating a linear regression based on the historical production data; (k) applying at least one present value to determine the at least one estimated performance ratio; (l) determining the plurality of performance thresholds by calculating an acceptable variance of the at least one performance ratio based upon the historical production data; (m) determining that the at least one performance ratio indicates a device failure; (n) identifying a device associated with the device failure; (o) transmitting a signal associated with the device failure; (p) determining that the at least one performance ratio does not indicate a device failure; (q) determining a probable explanation associated with the at least one performance ratio; and (r) transmitting a maintenance request.

Figure 2:
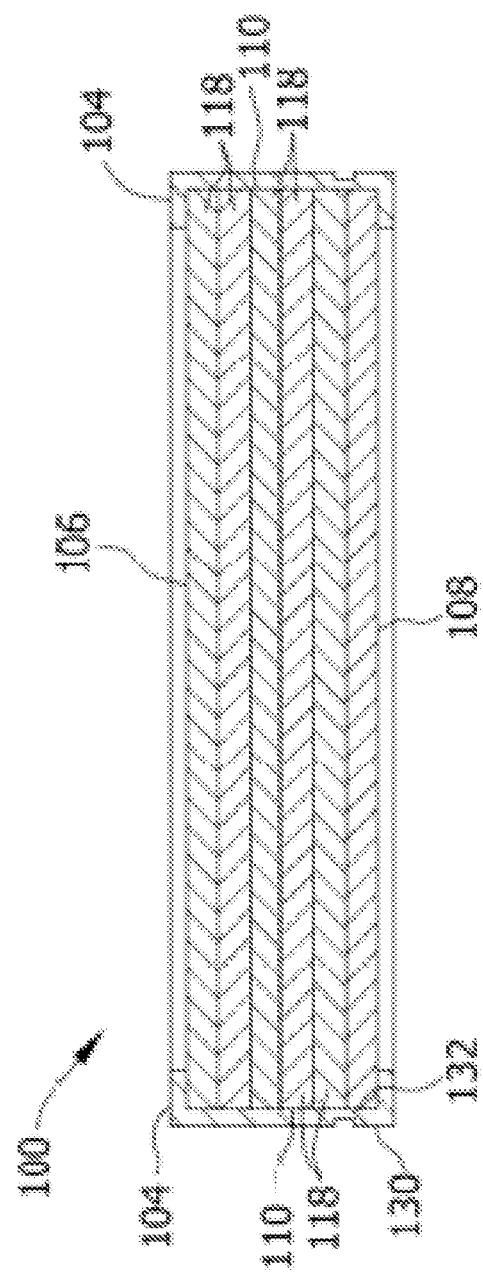
FIG. 2 is a cross-sectional view of the PV module shown in FIG. 1 taken along the line A-A.

Referring initially to FIGS. 1 and 2, a PV module is indicated generally at 100. A perspective view of the PV module 100 is shown in FIG. 1. FIG. 2 is a cross sectional view of the PV module 100 taken at line A-A shown in FIG. 1. The PV module 100 includes a solar laminate 102 (also referred to as a PV laminate) and a frame 104 circumscribing the solar laminate 102.

The solar laminate 102 includes a top surface 106 and a bottom surface 108 (shown in FIG. 2). Edges 110 extend between the top surface 106 and the bottom surface 108. In this embodiment, the solar laminate 102 is rectangular shaped. In other embodiments, the solar laminate 102 may have any suitable shape.

As shown in FIG. 2, the solar laminate 102 has a laminate structure that includes several layers 118. Layers 118 may include for example glass layers, non-reflective layers, electrical connection layers, n-type silicon layers, p-type silicon layers, and/or backing layers. In other embodiments, solar laminate 102 may have more or fewer layers 118, including only one layer, or may have different layers 118, and/or may have different types of layers 118. The solar laminate 102 includes a plurality of solar cells (not shown), each of which converts solar energy to electrical energy. The outputs of the solar cells are connected in series and/or parallel to produce the desired output voltage and current for the solar laminate 102.

As shown in FIG. 1, the frame 104 circumscribes the solar laminate 102. The frame 104 is coupled to the solar laminate 102, as best seen in FIG. 2. The frame 104 assists in protecting the edges 110 of the solar laminate 102. In this embodiment, the frame 104 is constructed of four frame members 120. In other embodiments the frame 104 may include more or fewer frame members 120.

This frame 104 includes an outer surface 130 spaced apart from solar laminate 102 and an inner surface 132 adjacent solar laminate 102. The outer surface 130 is spaced apart from and substantially parallel to the inner surface 132. In this embodiment, the frame 104 is made of aluminum. More particularly, in some embodiments the frame 104 is made of 6000 series anodized aluminum. In other embodiments, the frame 104 may be made of any other suitable material providing sufficient rigidity including, for example, rolled or stamped stainless steel, plastic, or carbon fiber.

Figure 3:
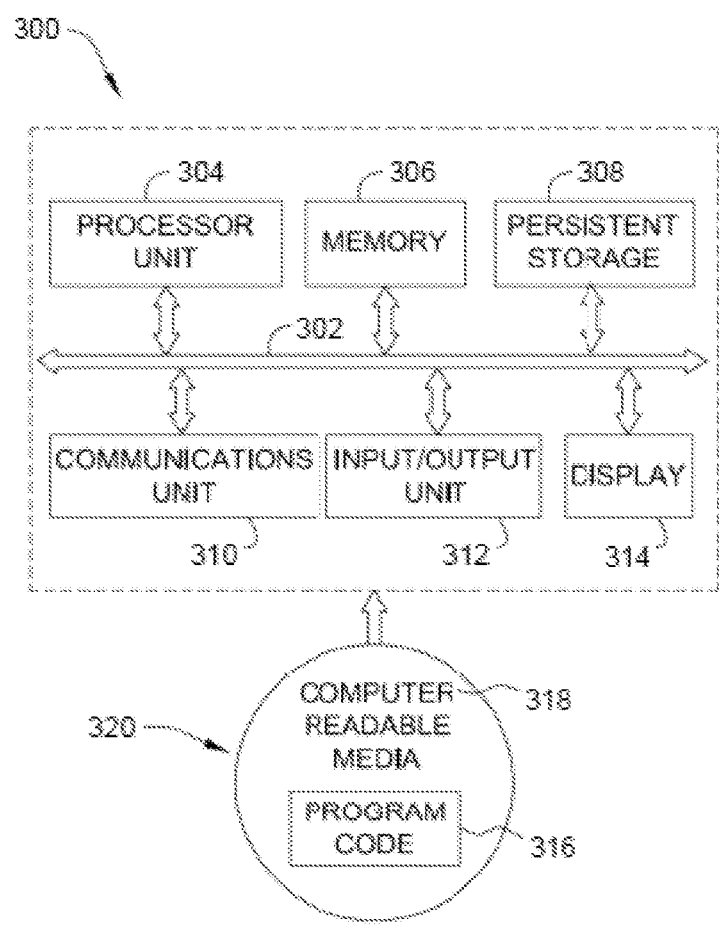
FIG. 3 is a block diagram of an example computing device.

Some exemplary methods and systems are performed using and/or include computing devices. FIG. 3 is a block diagram of an exemplary computing device 300. More specifically, computing device 300 represents an example embodiment of a monitoring computing device. In the exemplary implementation, computing device 300 includes communications fabric 302 that provides communications between a processor unit 304, a memory 306, persistent storage 308, a communications unit 310, an input/output (I/O) unit 312, and a presentation interface, such as a display 314. In addition to, or in alternative to, the presentation interface may include an audio device (not shown) and/or any device capable of conveying information to a user.

Processor unit 304 executes instructions for software that may be loaded into a storage device (e.g., memory 306). Processor unit 304 may be a set of one or more processors or may include multiple processor cores, depending on the particular implementation. Further, processor unit 304 may be implemented using one or more heterogeneous processor systems in which a main processor is present with secondary processors on a single chip. In another implementation, processor unit 304 may be a homogeneous processor system containing multiple processors of the same type.

Memory 306 and persistent storage 308 are examples of storage devices. As used herein, a storage device is any tangible piece of hardware that is capable of storing information either on a temporary basis and/or a permanent basis. Memory 306 may be, for example, without limitation, random access memory (RAM) such as dynamic RAM (DRAM) or static RAM (SRAM), read-only memory (ROM), erasable programmable read-only memory (EPROM), electrically erasable programmable read-only memory (EEPROM), non-volatile RAM (NVRAM), and/or any other suitable volatile or non-volatile storage device. Persistent storage 308 may take various forms depending on the particular implementation, and persistent storage 308 may contain one or more components or devices. For example, persistent storage 308 may be one or more hard drives, flash memory, rewritable optical disks, rewritable magnetic tapes, and/or some combination of the above. The media used by persistent storage 308 also may be removable. For example, without limitation, a removable hard drive may be used for persistent storage 308.

A storage device, such as memory 306 and/or persistent storage 308, may be configured to store data for use with the processes described herein. For example, a storage device may store (e.g., have embodied thereon) computer-executable instructions, executable software components, PV system component data, PV system layouts, installation instructions, work orders, and/or any other information suitable for use with the methods described herein. When executed by a processor (e.g., processor unit 304), such computer-executable instructions and/or components cause the processor to perform one or more of the operations described herein.

Communications unit 310, in these examples, provides for communications with other computing devices or systems. In the exemplary implementation, communications unit 310 is a network interface card. Communications unit 310 may provide communications through the use of either or both physical and wireless communication links. Communication unit 310 provides communication to one or more element of the PV system.

Input/output unit 312 enables input and output of data with other devices that may be connected to computing device 300. For example, without limitation, input/output unit 312 may provide a connection for user input through a user input device, such as a keyboard and/or a mouse. Further, input/output unit 312 may send output to a printer. Display 314 provides a mechanism to display information, such as any information described herein, to a user. For example, a presentation interface such as display 314 may display a graphical user interface, such as those described herein. The communication device 310 may include one or more analog I/O.

Instructions for the operating system and applications or programs are located on persistent storage 308. These instructions may be loaded into memory 306 for execution by processor unit 304. The processes of the different implementations may be performed by processor unit 304 using computer implemented instructions and/or computer-executable instructions, which may be located in a memory, such as memory 306. These instructions are referred to herein as program code (e.g., object code and/or source code) that may be read and executed by a processor in processor unit 304. The program code in the different implementations may be embodied in a non-transitory form on different physical or tangible computer-readable media, such as memory 306 or persistent storage 308.

Program code 316 is located in a functional form on non-transitory computer-readable media 318 that is selectively removable and may be loaded onto or transferred to computing device 300 for execution by processor unit 304. Program code 316 and computer-readable media 318 form computer program product 320 in these examples. In one example, computer-readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer-readable media 318 also may take the form of a persistent storage, such as a hard drive, a thumb drive, or a flash memory that is connected to computing device 300. The tangible form of computer-readable media 318 is also referred to as computer recordable storage media. In some instances, computer-readable media 318 may not be removable.

Alternatively, program code 316 may be transferred to computing device 300 from computer-readable media 318 through a communications link to communications unit 310 and/or through a connection to input/output unit 312. The communications link and/or the connection may be physical or wireless in the illustrative examples. The computer-readable media also may take the form of non-tangible media, such as communications links or wireless transmissions containing the program code.

In some illustrative implementations, program code 316 may be downloaded over a network to persistent storage 308 from another computing device or computer system for use within computing device 300. For instance, program code 316 stored in a computer-readable storage medium in a server computing device may be downloaded over a network from the server to computing device 300. The computing device providing program code 316 may be a server computer, a workstation, a client computer, or some other device capable of storing and transmitting program code 316.

Program code 316 may be organized into computer-executable components that are functionally related. Each component may include computer-executable instructions that, when executed by processor unit 304, cause processor unit 304 to perform one or more of the operations described herein.

The different components illustrated herein for computing device 300 are not meant to provide architectural limitations to the manner in which different implementations may be implemented. The different illustrative implementations may be implemented in a computer system including components in addition to or in place of those illustrated for computing device 300. For example, in some embodiments, computing device includes a global positioning system (GPS) receiver. Moreover, components shown in FIG. 3 can be varied from the illustrative examples shown. As one example, a storage device in computing device 300 is any hardware apparatus that may store data. Memory 306, persistent storage 308 and computer-readable media 318 are examples of storage devices in a tangible form.

In another example, a bus system may be used to implement communications fabric 302 and may include one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

Figure 4:
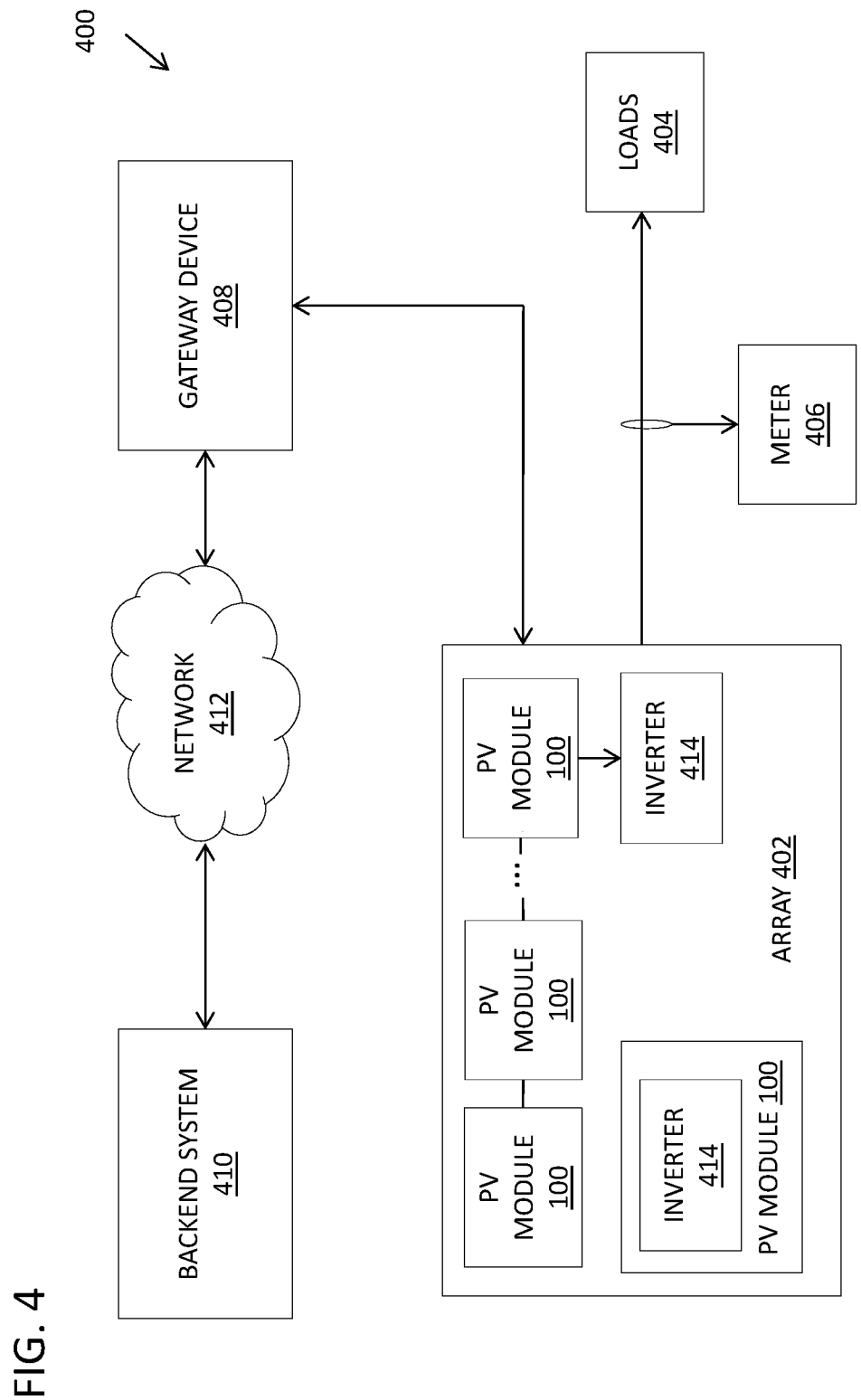
FIG. 4 is a block diagram of an example PV system.

FIG. 4 is a block diagram of an exemplary PV system 400. The PV system 400 includes an array 402 of PV modules 100 and one or more inverters. The array 402 outputs AC power to one or more loads 404. A meter 406 measures the power delivered to the loads 404. A gateway device 408, also referred to as a data acquisition device, a data logger, or a data acquisition system (DAS), monitors the array 402 and transmits data collected from the array 402 to a backend system 410 via a network 412. Backend system 410 includes one or more computing devices 300. Backend system 410 is usually located at a second location physically separated from the first location at which PV system 400 is located. Alternatively, the second system may be located at the same site as the PV system 400. Moreover, the gateway device 408 may provide information to and communicate with more than one backend systems 410. The distance between the first location and the second location will vary among installed PV systems 400. In some embodiments, the first location and the second location are greater than five miles apart. In other embodiments, the first and second locations are more than ten miles apart, 25 miles apart, 50 miles apart, 100 miles apart, 200 miles apart, or even located on different continents.

The array 402 may be any suitable array of PV modules 100 and one or more inverters 414 or other power conditioning devices. For example, the array 402 may include a plurality of PV modules arranged in strings of PV modules. Each string of modules is connected to a single inverter to convert the DC output of the string of PV modules to an AC output. Alternatively, or additionally, each PV module may be coupled to its own inverter 414 (sometimes referred to as a microinverter) positioned near or on the PV module to which it is electrically coupled. In still other examples, a plurality of strings of PV modules may be connected, directly or through one or more string combiners, to a single inverter 414, sometimes referred to as a central or string inverter.

In embodiments that do not include microinverters, the array 402 may include a direct current power manager (DCPM) coupled to each PV module. The DCPM performs, for example, maximum power point tracking (MPPT) for the PV module. It may also selectively control (i.e., limit and/or increase) the maximum power output of the PV module and/or control the conduction of bypass diodes based on temperature and bypass current. The DCPM may also translates the output I-V curve of the PV module to a new I-V curve at which the output voltage does not vary with ambient temperature.

In some embodiments, the array 402 includes one or more tracking devices configured to selectively position the PV modules relative to the sun to attempt to maximize the solar energy incident on the PV modules over time. Any other suitable arrangement of PV modules and inverter(s) may be used, including combinations of the arrangements described above.

The gateway device 408 collects data concerning array 402, such as via one or more sensors (not shown). The gateway device 408 is and/or includes a computing device, such as computing device 300. The collected data may include any appropriate operational, situational, environmental, or other data related to the operation and/or condition of the array 402. For example, the gateway may monitor the ambient air temperature around the array 402, the amount of sunlight incident on the array 402 (or one or more PV module), the output voltage and current of the array 402, the output voltage and current of each PV module, the output voltage and current of each inverter and/or microinverter 414, the surface temperature of the PV modules 100, etc. Moreover, in some embodiments, the gateway device 408 is in communication with one or more components of the array 402. For example, the gateway device 408 may be in communication with one or more inverters 414 in the array 402. Each inverter 414 may provide the gateway device 408 with, for example, its input voltage, its input current, its output voltage, its output current, etc. In some embodiments, the array 402 (and more particularly the inverters 414) may be controlled via the gateway device 408.

In one example, the network 412 is the Internet. In other implementations, network 412 is any other suitable communication network, including, for example, a wide area network (WAN), a local area network (LAN), a cellular network, etc. Network 412 may include more than one network. For example, gateway device 408 may connect to the Internet through one or more other networks and/or interfaces, such as a local area network (LAN), a wide area network (WAN), a home area network (HAN), dial-in-connections, cable modems, and high-speed ISDN lines.

Figure 5:
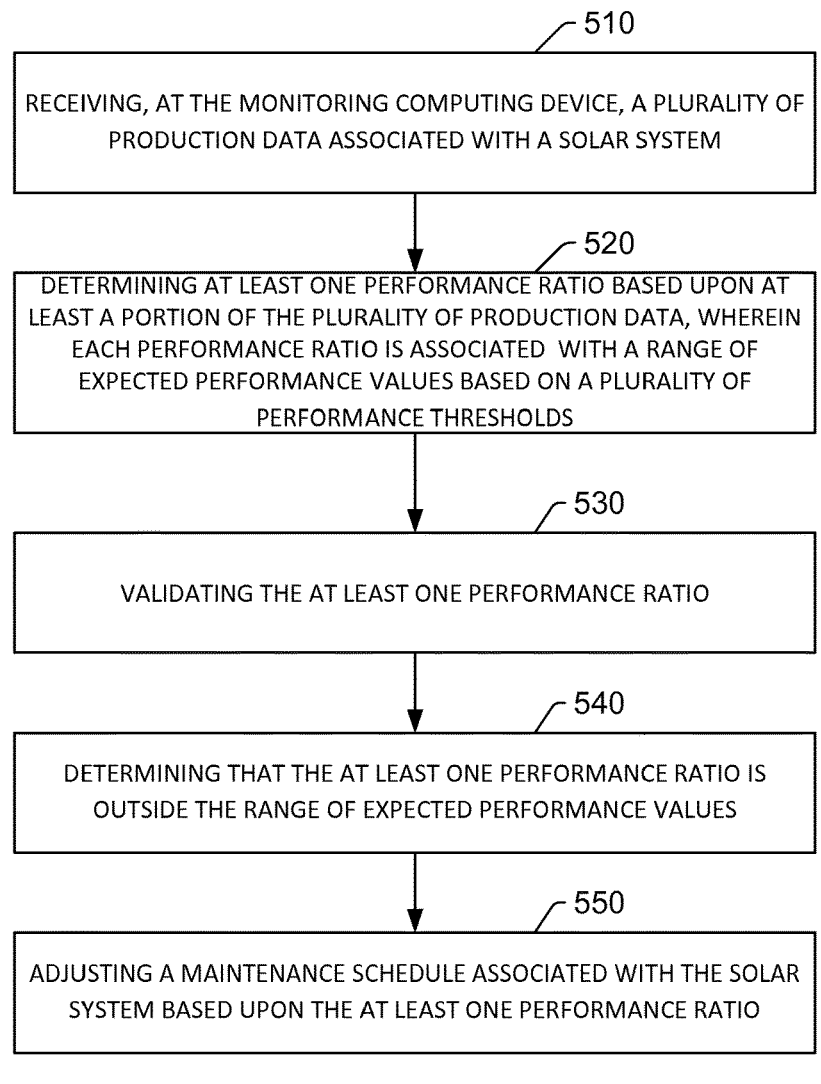
FIG. 5 is a flow diagram of an example method of performance ratio-based scheduling of solar module maintenance.

FIG. 5 is a flow diagram of an example method 500 of performance ratio-based scheduling of solar module maintenance. The method 500 is implemented by monitoring computing device 300. Monitoring computing device 300 receives 510 a plurality of production data associated with a solar module. In the example embodiment, receiving 510 represents receiving data associated with PV systems including power outputs, irradiance measurements, energy outputs, temperature measurements, and insolation measurements. Additionally, a plurality of additional data may be received to facilitate the calculation of performance ratios. For example, reference values may be received indicating power output or irradiance under standard test conditions. Alternately, a reference value for energy or insolation may be used.

Monitoring computing device 300 also determines 520 at least one performance ratio based upon at least a portion of the plurality of production data, wherein each performance ratio is associated with a range of expected performance values based on a plurality of performance thresholds. Determining 520 represents monitoring computing device 300 generating at least one of a standard performance ratio ("PR"), a temperature adjusted performance ratio ("PRt"), an investor performance ratio ("IPR"), a monitoring performance index ratio ("MPIR"), and an operating performance ratio ("OPR"), as described above. Alternately, monitoring computing device 300 may generate any other suitable ratio used for the scheduling of the maintenance of solar modules. Further, monitoring computing device 300 associates a plurality of performance thresholds associated with each performance ratio. The performance thresholds are determined by calculating an acceptable variance of the at least one performance ratio based upon the historical production data. The performance thresholds are used to determine a range of expected performance values. In at least some examples, the historical performance data is used to extrapolate an estimated performance ratio.

Monitoring computing device 300 also validates 530 the at least one performance ratio. Validating 530 represents monitoring computing device 300 confirming that the at least one performance ratio is valid and should be considered in scheduling maintenance of PV systems. Validating 530 may be accomplished in multiple methods including using performance ratios associated with time periods proximate to the calculated performance ratio to eliminate performance ratios based on transitory inaccurate measurements. Alternately, performance ratios may be compared to other metrics from the same time period to identify invalid performance ratios based on inaccurate measurements.

Monitoring computing device 300 also determines 540 that the at least one performance ratio is outside the range of expected performance values. Determining 540 represents monitoring computing device 300 comparing the performance ratio to the range of expected performance values or the associated performance thresholds.

Monitoring computing device 300 additionally adjusts 550 a maintenance schedule associated with the solar module based upon the at least one performance ratio. Adjusting 550 may represent updating the maintenance schedule or scheduling a next maintenance activity.

Figure 6:
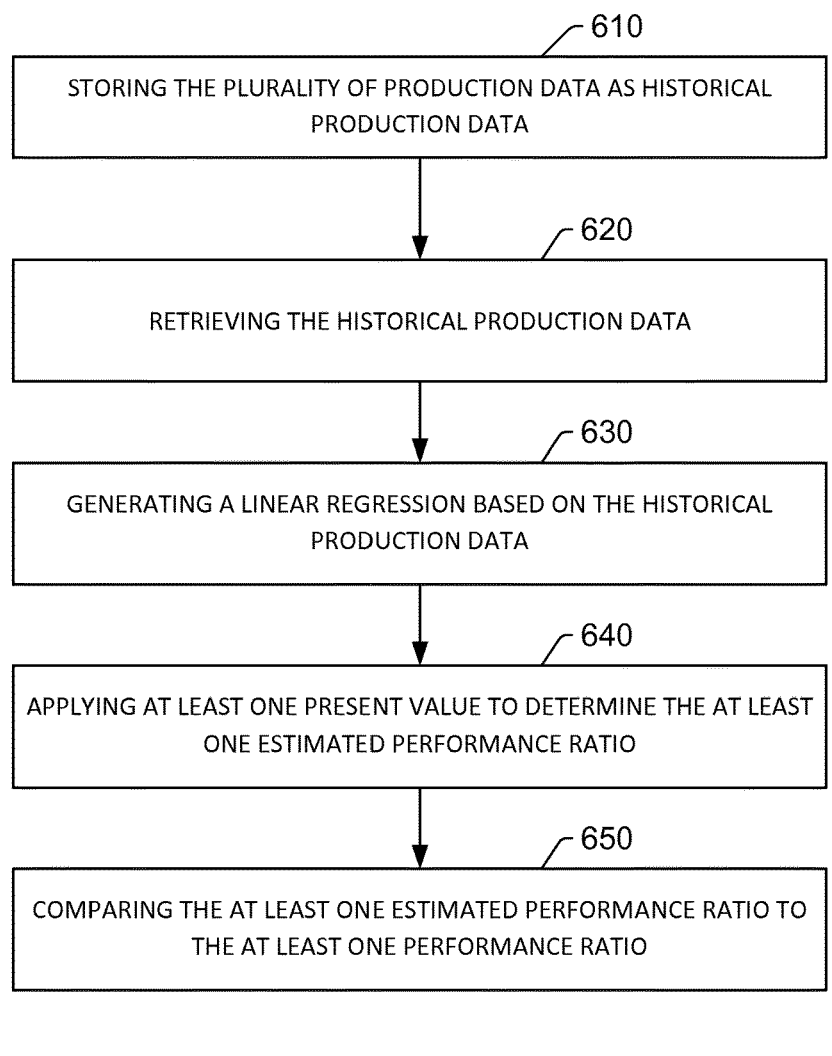
FIG. 6 is a flow diagram of another example method of performance ratio-based scheduling of solar module maintenance.

FIG. 6 is a flow diagram of another example method 600 of performance ratio-based scheduling of solar module maintenance. The method 600 is implemented by monitoring computing device 300. Monitoring computing device 300 stores in step 610 the plurality of production data as historical production data. Storing 610 represents storing production data received in receiving 510 as historical production data for analysis and processing as described herein. In the example embodiment, such historical production data may be stored at memory 306 or persistent storage 308 (both shown in FIG. 3).

Monitoring computing device 300 also retrieves 620 the historical production data. Retrieving 620 represents accessing stored historical production data from, for example, memory 306.

Monitoring computing device 300 further generates 630 a linear regression based on the historical production data. Generating 630 represents using stored historical production data to identify a relationship between production values and known variables such as time and meteorological conditions. The linear regression is used to extrapolate values used in calculating the range of expected performance values (and the performance thresholds).

Monitoring computing device 300 additionally applies 640 at least one present value to determine the at least one estimated performance ratio. Applying 640 represents using an equation generated by the linear regression and the present value to determine an estimated value of the performance ratio at present.

Monitoring computing device 300 also compares 650 the at least one estimated performance ratio to the at least one performance ratio. Comparing 650 represents identifying whether the production ratio corresponds to the estimated performance ratio. As described herein, such comparison facilitates determining whether the PV system appears to be in an expected state.

Figure 7:
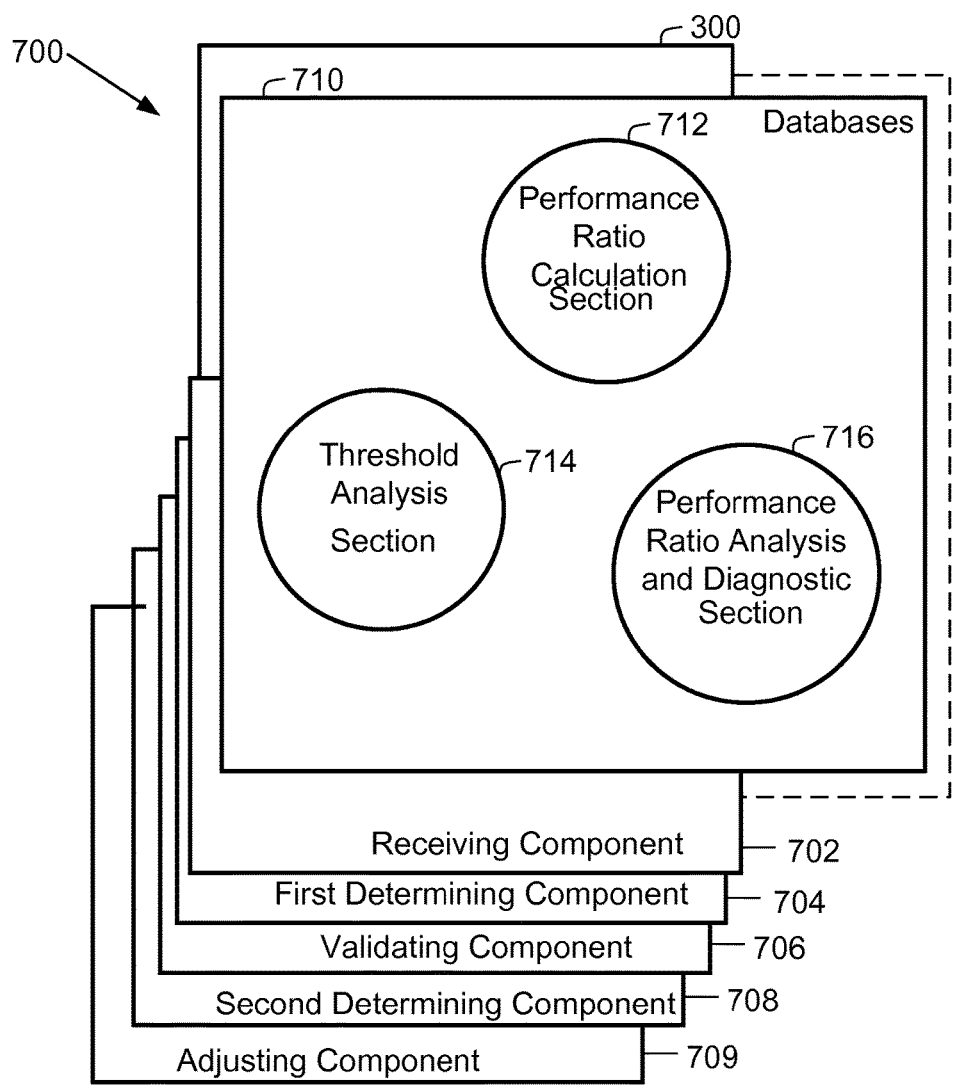
FIG. 7 is a diagram of components of example computing devices such as the computing device of FIG. 3.

FIG. 7 is a diagram 700 of components of example computing devices such as monitoring computing device 300 (shown in FIG. 4). FIG. 7 further shows a configuration of databases including at least database 710. Database 710 is coupled to several separate components within monitoring computing device 300, which perform specific tasks.

Irradiance analysis computing device 300 includes a receiving component 702 for receiving a plurality of production data associated with a solar module, array or power plant, a first determining component 704 for determining at least one performance ratio based upon at least a portion of the plurality of production data, wherein each performance ratio is associated with a range of expected performance values, a validating component 706 for validating the at least one performance ratio, a second determining component 708 for determining that the at least one performance ratio is outside the range of expected performance values, and an adjusting component 709 for adjusting a maintenance schedule associated with the solar module based upon the at least one performance ratio.

In an embodiment, database 710 is divided into a plurality of sections, including but not limited to, a performance ratio calculation section 712, threshold analysis section 714, and a performance ratio analysis and diagnostic section 716. These sections within database 710 are interconnected to update and retrieve the information as required.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A method for performance ratio-based scheduling of solar module maintenance, the method comprising:
   delivering power to at least one load from an array of photovoltaic (PV) modules;
   measuring, by a meter, the power delivered to the at least one load;
   collecting, via one or more sensors, a plurality of production data associated with the array of PV modules using a gateway device;
   transmitting, from the gateway device, the plurality of production data associated with the array of PV modules to a monitoring computing device, wherein the array of PV modules are located at a first location and the monitoring computing device is located at a second location physically separated from the first location;
   storing the plurality of production data as historical production data;
   determining at least one performance ratio based upon at least a portion of the plurality of production data, wherein each performance ratio is associated with a range of expected performance values;
   validating the at least one performance ratio;
   determining that the at least one performance ratio is outside the range of expected performance values, wherein determining that the at least one performance ratio is outside the range of expected performance values includes:
      retrieving the historical production data;
      determining at least one estimated performance ratio by extrapolating from the historical production data; and
      comparing the at least one estimated performance ratio to the at least one performance ratio; and
   adjusting a schedule to perform a next maintenance activity associated with the array of PV modules based upon the at least one performance ratio and performing the next maintenance activity according to the adjusted schedule.

2. The method of claim 1, further comprising:
   generating a linear regression based on the historical production data; and
   applying at least one present value to determine the at least one estimated performance ratio.

3. The method of claim 1, further comprising:
   determining the range of expected performance values by calculating an acceptable variance of the at least one performance ratio based upon the historical production data.

4. The method of claim 1, further comprising:
   determining that the at least one performance ratio indicates a device failure;
   identifying a device associated with the device failure; and
   transmitting a signal associated with the device failure.

5. The method of claim 1, further comprising:
   determining that the at least one performance ratio does not indicate a device failure;
   determining a probable explanation associated with the at least one performance ratio; and
   transmitting a maintenance request.

* * * * *